United States Patent Office 3,296,618
Patented Jan. 3, 1967

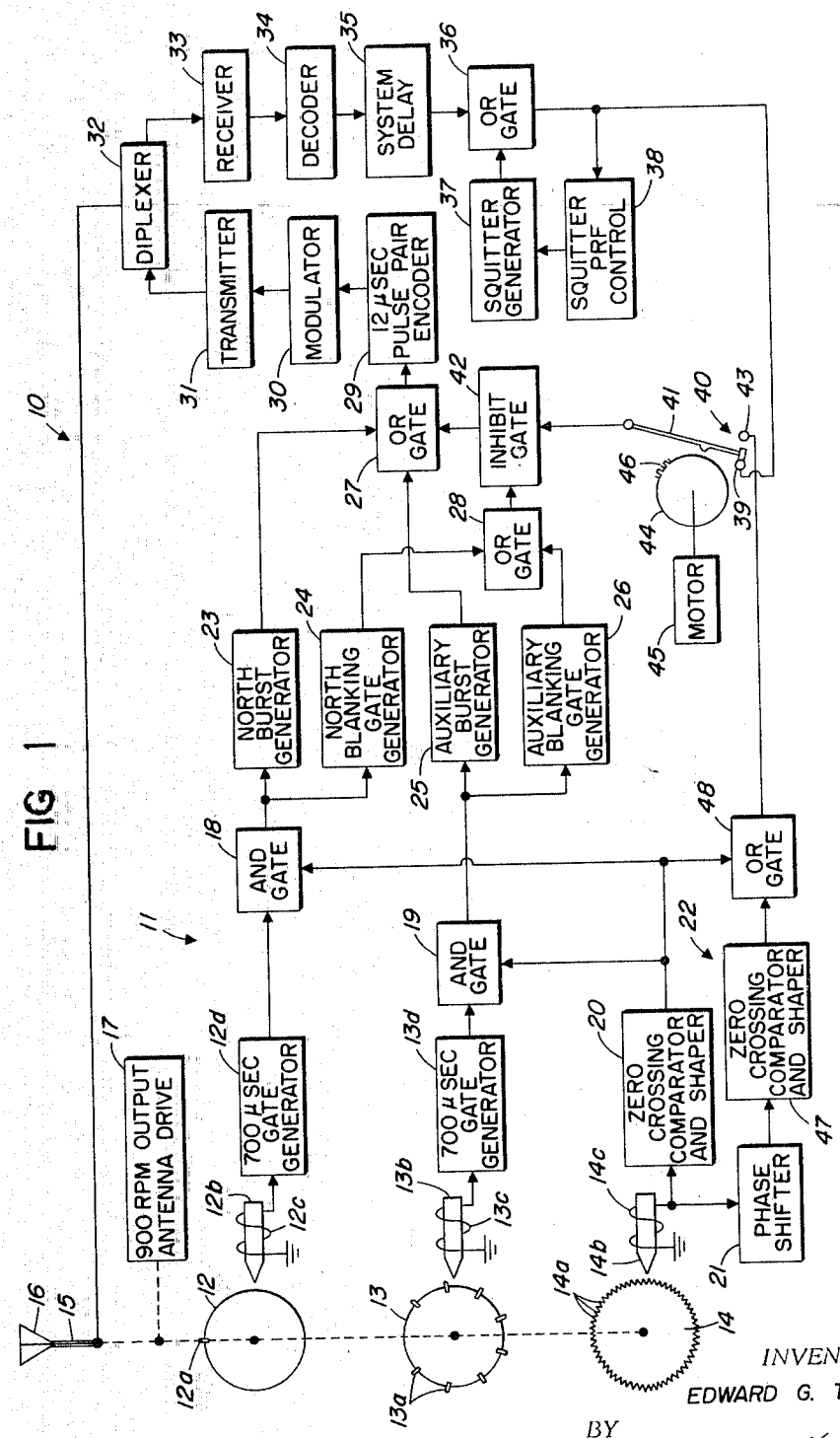

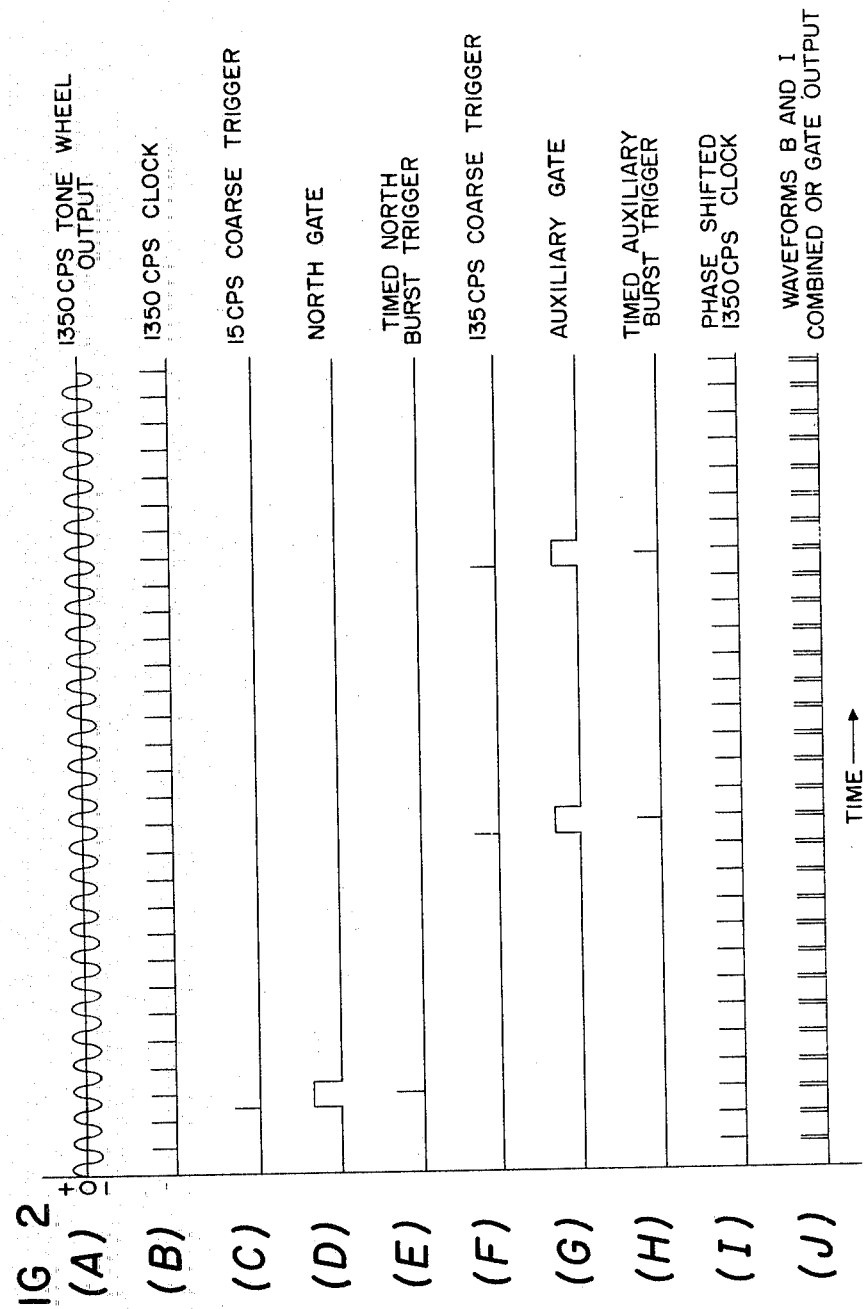

3,296,618
CLOCK TIMED REFERENCE GATED PULSE GENERATING SYSTEM FOR A TACAN BEACON
Edward G. Tuthill, Marion, Iowa, assignor to Collins Radio Company, Cedar Rapids, Iowa, a corporation of Iowa
Filed Apr. 24, 1964, Ser. No. 362,378
8 Claims. (Cl. 343—106)

This invention relates to north and auxiliary burst trigger signal and clock trigger TACAN signal generation, and more particularly to a synchronized electromechanical pulse generator for initiating a north and auxiliary signal burst gating sequence selecting specific accurately timed pulses of a signal clock generator. This synchronized signal burst generating system is applicable to test equipment simulating TACAN beacons as well as to actual TACAN beacon usage.

In a Tactical Air Navigation signal (TACAN) beacon, normally used as a ground or shipboard navigation facility, reference bursts (pulse trains) must be generated to serve as reference points. These reference points are used for measuring the phase of a 15 c.p.s. and a 135 c.p.s. amplitude modulation of the radiated RF signal to enable an airborne TACAN set to determine the bearing to the TACAN beacon. In addition, pulse pairs at a pulse repetition frequency (p.r.f.) of 1350 pulse pairs per second, phase locked to the reference bursts, must be generated to serve as an identifying signal.

Many TACAN beacons presently in use utilize ferromagnetic slugs rotating past electromagnetic coils with magnetic cores for providing trigger signals utilized directly for generating north and auxiliary reference signal bursts. The discs, generally one each for the north and auxiliary bursts, rotate at 900 r.p.m. (i.e., 15 r.p.s.), the same speed as the antenna elements producing the amplitude modulation. The north pulse is generated by a single slug mounted on one disc while the auxiliary pulses are generated by eight slugs spaced at 40° intervals as if there were nine slugs with one omitted at the position corresponding to the single slug in the north pulse generating disc. The 1350 p.r.f. identity triggers are generated by a ringing oscillator arrangement triggered at a 135 c.p.s. rate by the auxiliary triggers plus the north trigger pulse. In such systems, positioning of the slugs is extremely critical to prevent misplaced reference pulse bursts and resulting jitter in the phase measuring circuitry of airborne TACAN sets. For example, slugs misplaced by ±1.0 degrees in a disc will cause a phase jitter of ±9.0 degrees in the 135 c.p.s. phase measuring circuitry. Obviously, the ringing oscillator circuit must be extremely stable to provide triggers at a constant spacing for the identity circuits and requires very careful adjustment. Unless this adjustment is precise, the tenth pulse from the ringing oscillator will not occur in synchronous with a corresponding pulse of the 135 c.p.s. trigger. Further, with ringing oscillator systems, synchronous rotation of the antenna is a critical factor.

It is, therefore, a principal object of this invention to provide a 1350 c.p.s. clock trigger input signal generating system permitting the elimination of previously used electronic ringing systems.

Another object is to provide a synchronized electromechanical pulse generating system with north and auxiliary signal burst gating of specific accurately timed pulses of a signal clock generator.

A further object is to produce an identification signal precisely phase locked with the reference bursts and amplitude modulation developed with rotation of the antenna.

Features of this invention useful in accomplishing the above objects include the use of three slug mounting and/or toothed discs commonly connected for rotation with the shaft of a rotating antenna assembly designed for rotation at approximately 900 r.p.m. A one-slug disc provides a coarse north burst trigger gate signal through a 700 microsecond gate generator to an AND gate of the north burst trigger circuit. An eight-slug disc, with spacings as if there were nine slugs, with, however, the slug aligned with the north burst trigger slug of the one-slug disc omitted, provides coarse auxiliary burst trigger signals through a 700 microsecond gate generator to an AND gate of the auxiliary burst trigger signal circuit. The third disc has 90 teeth spaced 4 degrees apart and when rotating at 900 r.p.m. acts as a 1350 c.p.s. sinusoidal tone wheel in providing a signal applied through a zero crossing comparator and shaper. This develops a narrow pulse 1350 pulse per second clock trigger output applied to both the north burst trigger circuit AND gate and the auxiliary burst trigger circuit AND gate. The slug of the north burst trigger gate disc, slugs of the auxiliary burst trigger disc, and teeth of the tone wheel rotate past the magnetic cores of the pickup coils of the north burst trigger circuit, auxiliary burst trigger circuit, and the clock signal circuit, respectively, in this system.

A specific embodiment representing what is presently regarded as the best mode of carrying out the invention is illustrated in the accompanying drawings.

In the drawings:
FIGURE 1 represents a combination block and schematic diagram of the clock timed reference gated pulse generating system used in a TACAN beacon transmitting and receiving station; and
FIGURE 2, the waveforms at various points in the clock timed reference gated pulse generating system of the TACAN beacon station.

Referring to the drawings:
The TACAN beacon transmitting and receiving station 10 of FIGURE 1 is shown to have a clock timed reference gated pulse generating system 11. The system includes two slug mounting discs 12 and 13 and a toothed disc 14 commonly connected for rotation with shaft 15, of a rotating antenna assembly 16, all driven in rotation at approximately 900 r.p.m. by antenna drive 17. Disc 12 is provided with a single north burst trigger slug 12a for inducing, as the slug is rotated by the magnetic core 12b of pickup coil 12c, a trigger signal in the coil 12c. This trigger signal is passed as an input to gate generator 12d where each received pulse from pickup coil 12c is utilized to develop a gate signal approximately 700 microseconds in duration. Each 700 microsecond output gate signal of generator 12d is passed as one input to AND gate 18.

Disc 13 is provided with eight slugs 13a, spaced at substantially 40° intervals as if there were nine slugs, with, however, one omitted at the position corresponding to the single slug 12a of north pulse generating disc 12. Auxiliary burst trigger slugs 13a induce, as they are rotated by the magnetic core 13b of pickup coil 13c, trigger signals in the coil 13c. These trigger signals are passed as inputs to gate generator 13d where each received pulse from pickup coil 13c is utilized to develop a gate signal approximately 700 microseconds in duration. Each 700 microsecond output gate signal of gate generator 13d is passed as one input to AND gate 19.

Disc 14 is provided with 90 accurately machined teeth 14a spaced substantially 4 degrees apart for inducing, as the teeth are rotated by the magnetic core 14b of pickup cool 14c, closely spaced impulse signals in the coil 14c. With disc 14 rotating at 900 r.p.m., it acts as a tone wheel developing, preferably, a sine wave 1350 c.p.s. signal passed as an input to zero crossing comparator and shaper 20 where the input from pickup coil 14c is converted to a series of pulse triggers approximately 1 microsecond wide, evenly spaced at a pulse repetition frequency of 1350 pulses per second. These evenly spaced 1350 pulses per second out of zero crossing comparator and shaper 20 serve as a reference timing clock signal applied as an additional input to both the north burst circuit AND gate 18 and the auxiliary burst circuit AND gate 19.

While a 1350 c.p.s. sine wave output is indicated from the tone wheel disc 14 and coil 14c and the comparator 20 generates pulses in one direction of signal zero crossings as indicated in the figures, particularly by the waveforms of FIGURE 2, a nonsinusoidal output and appropriate pulse shaping circuitry could instead be used. However, use of a sinusoidal 1350 c.p.s. output has certain advantages in providing a signal readily useful for monitoring antenna rotation speed. The 1350 c.p.s. sinusoidal output from coil 14c may also be used as an input to phase shifter 21 of an added identity equalizing pulse circuit 22 described later herein.

With coarse north burst trigger gate inputs to AND gate 18 of approximately 700 microseconds in duration in coincidence with a 1 microsecond wide timing clock pulse, the 1 microsecond wide pulse is passed as an output from the AND gate 18 to both a north burst generator 23 and a north blanking gate generator 24. With auxiliary burst trigger gate inputs to AND gate 19 of approximately 700 microseconds in duration in coincidence, respectively, with 1 microsecond wide timing clock pulses, the 1 microsecond wide pulses in coincidence with each auxiliary gate signal are passed through AND gate 19 to both an auxiliary burst generator 25 and an auxiliary blanking gate generator 26.

The outputs of north burst generator 23 and auxiliary burst generator 25 are applied as two inputs to OR gate 27. These outputs may be, for example, bursts of twelve pulses spaced 30 microseconds from north burst generator 23 for each input pulse, and bursts of six pulses spaced 24 microseconds from auxiliary burst generator 25. The outputs of north blanking gate generator 24 and the auxiliary blanking gate generator 26 are applied as the inputs to OR gate 28, and may be, for example, 380 and 160 microsecond gates, respectively. The output of OR gate 28 acts as an inhibit gate signal input to intervening circuitry in a third input path to OR gate 27. The output of OR gate 27 is passed as an input to a 12 microsecond pulse pair encoder 29 which duplicates each pulse input signal thereto with an additional 12 microsecond delayed duplicate image thereof in providing a pulse paired output for each pulse input. The pulse pair output from encoder 29 is passed as an input to modulator 30 and in RF modulated form on through transmitter 31 to and through diplexer 32 to antenna 16 as the output radiated signal from the antenna 16.

Signals received by antenna 16 are, especially during intervals of nontransmission from antenna 16, and also some during periods of signal transmission, applied through diplexer 32 to receiver 33. The output of receiver 33 is passed through decoder 34 and in decoded form through a system delay circuit 35 to OR gate 36. A squitter generator 37 also provides an input to OR gate 36 while the output of OR gate 36 is applied as an input to a squitter p.r.f. control circuit 38, in turn providing an input control signal to the squitter generator 37 to maintain a constant duty cycle.

The output of OR gate 36 is also applied to a normally closed contact 39 of an ident-keying switch 40, the movable arm 41 of which is connected through an inhibit gate circuit 42 to OR gate 25. The movable arm 41 of switch 40 is driven from normally closed contact 39 by ident-keying cam 44, which is driven in rotation approximately 2 r.p.m. by motor 45. The code cam portion 46 of cam 44 drives the movable arm 41 from normally closed contact 39 to normally open contact 43, in providing ident-code keying, as by Morse code signaling, through approximately four seconds, at most, during each revolution of wheel 44. The ident-keying cam 44 could be driven at higher r.p.m. with the code cam portion 46 covering a greater portion of the circumference with blanking means used to prevent signal passage from the extraneous actuations of switch 40.

Referring again to identity equalizing pulse circuit 22, the 1350 c.p.s. sinusoidal output from coil 14c is phase shifted by phase shifter 21 by an amount necessary to delay shift the zero crossings by approximately 100 microseconds. This phase shifted output signal from phase shifter 21 is passed to zero crossing comparator and shaper 47 for converting the phase shifted sinusoidal input thereto to pulse triggers approximately 1 microsecond wide, substantially 100 microseconds behind the corresponding 1 microsecond wide signals out of zero crossing comparator and shaper 20. The outputs of these two zero crossing comparators and shapers 20 and 47 are applied to OR gate 48 from which output signaling is passed to normally open contact 43 of switch 40 and through switch 40, only during periods of identification keying, as an input to inhibit gate 42, outputs from which are passed to OR gate 27. Pulse signals out of OR gate 36 and signal content out of OR gate 48 during periods of ident-code keying are passed as inputs through the third input path to OR gate 27 except during the periods of time that inhibit gate 42 receives inhibit gate signals from OR gate 28.

The 1350 c.p.s. tone wheel 14 and coil 14c output must provide accurate zero crossings with spacings of substantially the 740.74 microsecond reciprocal of 1350 c.p.s. This is easily accomplished within reasonable machining tolerances with standard tools used for cutting spur gears. It should be noted that while two of the discs are shown to mount slugs and the other has teeth, that they all could be machined to provide projections in place of the slugs.

The system reduces the need for critical positioning of slugs for the development of north and auxiliary burst triggers with displacement of as much as ±3.5° from the optimum positions being possible without affecting system accuracy. Further, this is accomplished with the 1350 c.p.s. triggers for identification being generated in a straightforward manner without any frequency adjustment requirements. While the gate generators 12d and 13d are indicated as being 700 microsecond generators, they could provide up to a maximum of 739.7 microsecond long gate output signals applied to the respective AND gates 18 and 19 along with clock pulses in the system. Since the clock pulses have a spacing of 740.74 microseconds, not more than one clock pulse could be in time coincidence with each 700 microsecond long north gate, and with each of the 700 microsecond long auxiliary gates.

Referring again to FIGURE 2, a 1350 c.p.s. sinusoidal tone wheel and coil 14c output waveform A is shown. The 1 microsecond wide 1350 c.p.s. clock pulse waveform B is developed from the positive going zero crossings of waveform A. Waveform C is the 15 c.p.s. coarse north pulse trigger, waveform D is the resulting north gate signal out of generator 12d, and waveform E is the resulting clock timed north burst gated pulse trigger output from AND gate 18. Waveform F is the auxiliary burst trigger output, waveform G is the resulting auxiliary gate output from generator 13d, and waveform H is the resulting clock timed auxiliary burst gated pulse trigger output from AND gate 19. Waveform I is the result of waveform A passed through phase shifter 21 and then derived from the positive going zero crossings of the phase shifted sinusoidal waveform and shaped to provide 1 microsecond wide pulses delayed substantially 100 microseconds from the corresponding pulses of waveform B. Waveform J is the combined B and I waveforms out of OR gate 48.

Thus, there is herein provided a 1350 c.p.s. clock trigger input signal generating system with previously used electronic ringing systems replaced by a synchronized electromechanical pulse generating system featuring north and auxiliary signal pulse gating of accurately timed pulses of the signal clock generator. It is a system providing an identification signal precisely phase locked with reference bursts and with the amplitude modulation developed with rotation of the antenna.

Whereas this invention is here illustrated and described with respect to a specific embodiment thereof, it should be realized that various changes may be made without departing from the essential contribution to the art made by the teachings hereof.

I claim:

1. A synchronized electromechanical pulse generator for initiating signal burst gates selecting specific accurately timed pulses of a signal clock generator, including: an electromechanical clock signal generating circuit; electromechanical pulse gate generating means; drive means interconnecting said clock signal generating circuit and said pulse gate generating means providing synchronous drive to the clock signal generating circuit and the pulse gate generating means; signal gating means connected for receiving gating input pulses from said electromechanical pulse gate generating means, and with said gating means also receiving the output of said electromechanical clock signal generating circuit for gating of specific accurately timed pulses of the clock signal generator to utilizing equipment; said electromechanical clock signal generating circuit being constructed to provide a train of substantially uniformly spaced, relatively narrow, clock pulses and including a rotatable disc with uniformly spaced elements capable of inducing an electronic pickup in an electronic signal circuit as the disc is being rotated; said clock signal generating circuit also including an induced electronic signal pickup circuit in operative relation with said rotatable disc; said pulse gate generating means being constructed to generate pulses of greater duration than the clock pulses of said clock signal generating circuit and with said gating pulses in synchronism with specific pulses of the clock signal pulse train; with said electromechanical pulse gate generating means including a second rotatable disc having at least one element capable of inducing an electronic pickup in an electronic gate signal circuit as the disc is being rotated; and said pulse gate generating means also including an induced electronic gate signal pickup circuit in operative relation with said second rotatable disc.

2. The synchronized electromechanical pulse generator of claim 1, wherein the rotatable disc of said clock signal generating circuit is a tone wheel and the electronic signal circuit includes a coil and core assembly constructed and so positioned with said tone wheel to develop substantially a sine wave signal in the associated electronic signal circuit; a zero crossing comparator and shaper circuit connected for receiving the sine wave signal as an input and developing therefrom the train of substantially uniformly spaced, relatively narrow, clock pulses applied as an input to said gating means.

3. The synchronized electromechanical pulse generator of claim 2, wherein the sine wave signal is also applied to a phase shifter, and in phase shifted form out of the phase shifter to an additional zero crossing comparator and shaper that produces a train of delayed uniformly spaced, relatively narrow, pulses duplicating the clock pulses in delayed form for use in following equipment.

4. The synchronized electromechanical pulse generator of claim 1, wherein said pulse gate generating means includes at least two pulse gate generating circuits; with each of said pulse gate generating circuits having its own specific rotatable disc signal actuating means, with one of said disc signal actuating means including one element capable of inducing an electronic pickup in an electronic gate signal circuit, and with additional rotatable disc signal actuating means having more than one element, capable of inducing an electronic pickup in an electronic gate signal circuit, and limited to fewer elements than with the rotatable disc of said electromechanical clock signal generating circuit; an induced electronic gate signal pickup circuit in operative relation with each of said rotatable disc means; and said signal gating means including multiple AND gate circuits individually connected for receiving gate input pulses from respective pulse gate generating circuits, and also receiving the output of said electromechanical clock signal generating circuit.

5. The synchronized electromechanical pulse generator of claim 4, being part of a tactical air navigation signal beacon system including an antenna; and wherein said drive means interconnecting said clock signal generating circuit and said pulse gate generating means is also drive connected to rotate said antenna to give synchronous drive to the clock signal generating circuit, the pulse gate generating means, and the antenna.

6. The synchronized electromechanical pulse generator of claim 5, wherein the rotatable disc of said clock signal generating circuit is a tone wheel; said disc signal actuating means including one element is a north burst trigger impulse generating means, said additional rotatable disc signal actuating means having more than one element and fewer elements than the rotatable disc of said clock signal generating circuit is an auxiliary burst trigger impulse signal generator; each of said pulse gate generating circuits including a gate signal generator connected to receive gating trigger impulse signals for developing gate outputs applied to the respective AND gates.

7. The synchronized electromechanical pulse generator of claim 5, wherein said electronic signal circuit includes a coil and core assembly so constructed and spaced relative to said tone wheel, and with the tone wheel elements shaped and spaced to develop substantially a sine wave signal in the associated electronic signal circuit when the tone wheel is rotating within a predetermined speed range; a zero crossing comparator and shaping circuit connected for receiving the sine wave signal as an input and developing therefrom the train of substantially uniformly spaced, relatively narrow, clock pulses applied as an input to said gating means; and with the sine wave being substantially a 1350 c.p.s. sine wave; and the train of clock pulses being a train of substantially 1 microsecond wide pulses at a substantially uniform spacing of 740.74 microseconds.

8. The synchronized electromechanical pulse generator of claim 7, wherein the 1350 c.p.s. sine wave signal is also applied to a phase shifter providing a phase shift of substantially 100 microseconds in the phase shifter output; the phase shifter output being connected to an additional zero crossing comparator and shaper capable of producing an output train of pulses duplicating said clock pulses in substantially 100 microsecond delayed form; and the output of said additional zero crossing comparator and shaper being connected to identification keying circuitry and other circuitry utilizing timed triggers for the north burst, auxiliary burst, and identity pulse pairs produced with aid of additional encoder circuitry of the tactical air navigation signal beacon system.

References Cited by the Examiner

UNITED STATES PATENTS

| | | | |
|---|---|---|---|
| 2,233,045 | 2/1941 | Bonner et al. | 307—106 X |
| 2,435,207 | 2/1948 | Dimond | 328—63 |
| 2,617,984 | 11/1952 | Coykendall | 343—5 |
| 3,004,256 | 10/1961 | Parker | 343—106 |
| 3,123,820 | 3/1964 | Harpell | 343—106 |

RODNEY D. BENNETT, *Acting Primary Examiner.*

H. C. WAMSLEY, *Assistant Examiner.*